United States Patent
McKnight et al.

(10) Patent No.: US 10,296,073 B2
(45) Date of Patent: *May 21, 2019

(54) SERVER RACK FUEL CELL

(71) Applicant: Microsoft Technology Licensing LLC., Redmond, WA (US)

(72) Inventors: Gregory Joseph McKnight, Bellevue, WA (US); Shaun L. Harris, Sammamish, WA (US); Sean M. James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/402,207

(22) Filed: Jan. 9, 2017

(65) Prior Publication Data

US 2017/0115720 A1    Apr. 27, 2017

Related U.S. Application Data

(63) Continuation of application No. 13/720,966, filed on Dec. 19, 2012, now Pat. No. 9,563,483.

(51) Int. Cl.
   *G06F 1/32*    (2019.01)
   *G06F 1/329*   (2019.01)
   (Continued)

(52) U.S. Cl.
   CPC .............. *G06F 1/329* (2013.01); *G06F 1/206* (2013.01); *G06F 1/3206* (2013.01); *G06F 9/5094* (2013.01); *Y02D 10/22* (2018.01)

(58) Field of Classification Search
   CPC ........ G06F 1/3202; G06F 1/3231; G06F 1/26; G06F 1/206; G06F 1/3228; G06F 1/08;
   (Continued)

(56) References Cited

U.S. PATENT DOCUMENTS 7,378,165 B2    5/2008 Brignone et al.
7,799,474 B2    9/2010 Lyon et al.
(Continued)

FOREIGN PATENT DOCUMENTS

WO    2007082351 A1    7/2007

OTHER PUBLICATIONS

"Fuel Cells for Data Centres", Retrieved at: <<http://web.archive.org/web/20081230151602/http://www.rittal.de/downloads/PrintMedia/RimatriX5/RimatriX5_Brennstoffzellen_2stg_gb.pdf>>, Oct. 31, 2012, 2 Pages.

(Continued)

*Primary Examiner* — Zahid Choudhury
(74) *Attorney, Agent, or Firm* — The Watson I.P. Group, PLC; Vladan M. Vasiljevic

(57) ABSTRACT

Computing devices receive power from multiple fuel cells, consuming natural gas and outputting electrical energy natively consumable by the computing devices. The fuel cells are sized to provide power to a set of computing devices, such as a rack thereof. The computing devices of a failed fuel cell can receive power from adjacent fuel cells. Additionally, the fuel cells and computing devices are positioned to realize thermal symbiotic efficiencies. Controllers instruct the computing devices to deactivate or throttle down power consuming functions during instances where the power consumption demand is increasing faster than the power being sourced by fuel cells, and instruct the computing devices to activate or throttle up power consuming functions during instances where the power consumption demand is decreasing faster than the power being sourced by the fuel cells. Supplemental power sources, supplementing the fuel cells' inability to quickly change power output, are not required.

20 Claims, 3 Drawing Sheets

(51) Int. Cl.
*G06F 1/3206* (2019.01)
*G06F 9/50* (2006.01)
*G06F 1/20* (2006.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 7,800,340 | B2 | 9/2010 | Berntsen et al. |
| 8,001,407 | B2 | 8/2011 | Malone et al. |
| 2004/0219397 | A1 | 11/2004 | Lyon et al. |
| 2004/0265662 | A1 | 12/2004 | Brignone et al. |
| 2008/0104430 | A1 | 5/2008 | Malone et al. |
| 2009/0050591 | A1 | 2/2009 | Hart et al. |
| 2010/0064150 | A1 | 3/2010 | Higuchi |
| 2010/0131959 | A1 | 5/2010 | Spiers et al. |
| 2010/0211233 | A1 | 8/2010 | Roscoe et al. |
| 2011/0156480 | A1 | 6/2011 | Park |
| 2011/0316338 | A1 | 12/2011 | Peterson et al. |
| 2013/0253716 | A1* | 9/2013 | Gross .................. G06F 1/26 700/287 |

OTHER PUBLICATIONS

"Opportunities for Combined Heat and Power in Data Centers", Published in DOE Report, ICF International, Report No. ORNL/TM-2009/052, Mar. 2009, 64 Pages.

"Today's Available Commercial Fuel Cell Systems", Retrieved at: <<http://web.archive.org/web/20111010222324/http://www.upssystems.co.uk/standby-power-products/fuel-cells/todays-available-commercial-fuel-cell-systems/>>, Oct. 31, 2012, 6 Pages.

"International Preliminary Report on Patentability Issued in PCT Application No. PCT/US2013/076722", dated Aug. 18, 2015, 7 Pages.

"International Search Report and Written Opinion Issued in PCT Application No. PCT/US2013/076722", dated Jan. 30, 2015, 11 Pages.

"Second Written Opinion Issued in PCT Application No. PCT/US2013/076722", dated May 22, 2015, 5 Pages.

Walters, Ray, "Apple is Researching Fuel Cell Powered Computers", Retrieved at: <<https://www.extremetech.com/computing/110229-apple-is-researching-fuel-cell-powered-computers>>, Dec. 23 2011, 3 Pages.

"Office Action Issued in European Patent Application No. 13821319.4", dated May 15, 2018, 6 Pages.

* cited by examiner

SERVER RACK FUEL CELL

CROSS-REFERENCE TO RELATED APPLICATION

This application is a continuation of U.S. patent application Ser. No. 13/720,966, filed on Dec. 19, 2012 and entitled "SERVER RACK FUEL CELL", the entire specification of which is hereby incorporated by reference.

BACKGROUND

The throughput of communications between computing devices continues to increase as modern networking hardware enables physically separate computing devices to communicate with one another orders of magnitude faster than was previously possible. Furthermore, high-speed network communication capabilities are being made available to a greater number of people, both in the locations where people work, and in their homes. As a result, an increasing amount of data and services can be meaningfully provided to an increasing audience via such network communications. The utility of computing devices, therefore, increasingly lies in their ability to communicate with one another.

In particular, it has become more practical to perform digital data processing at a location remote from the location where such data is initially generated, and where the processed data will be consumed. For example, a user can upload a digital photograph to a server and then cause the server to process the digital photograph, changing its colors and applying other visual edits to it. In such an example, the digital processing, such as of the photograph, is being performed by a device that is remote from the user. In another, more common, example, users utilize services and functionality that are conceptually simple, such as search services, but which, in fact, require vast amounts of processing capability.

To provide such data and processing capabilities, via network communications, from a centralized location, the centralized location typically comprises hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". With the increasing availability of high-speed network communication capabilities, and thus the increasing provision of data and services from centralized locations, as well as the traditional utilization of data centers, such as the provision of advanced computing services and massive amounts of computing processing capability, the size and quantity of datacenters continues to increase.

However, data centers often consume large quantities of electrical power, especially by the computing devices themselves. Typically, such electrical power is sourced from electrical utility grids and other municipal providers of electrical power. Such electrical power is typically received in the form of alternating current electrical energy and must be both converted to direct current electrical energy and reduced in voltage in order to be directly utilized by the processing units and other circuitry of the computing devices. Such conversions introduce inefficiencies, both in the sub-optimal utilization of purchased electrical power, and in the need to purchase, maintain and support the devices performing such conversions.

A fuel cell can consume a fuel, typically natural gas, and can natively output direct current electrical energy at a potential that can be directly utilized by the processing units and other circuitry of computing devices, such as computing devices in a data center. However, due to the nature of the process by which a fuel cell converts fuel into electrical energy, fuel cells cannot quickly modify the amount of electrical power that they produce. Thus, for example, if a fuel cell was utilized to power one or more server computing devices, and there was a need for the server computing devices to suddenly increase their processing, the fuel cell would not be able to immediately source the increased electrical current now requested by the server computing devices and, consequently, the voltage of the electrical power being output by the fuel cell would droop, thereby causing the computing devices to shutdown, unless alternative sources of electrical power were available. Similarly, if the server computing devices were to suddenly decrease their processing, the fuel cell would not be able to reduce its electrical power output sufficiently quickly, and the decreased electrical current now being requested by the server computing devices would cause the voltage of the electrical power being output by the fuel cell to surge, thereby potentially damaging the computing devices.

Prior utilizations of fuel cell technology to power computing devices have relied upon supplemental sources of electrical power, such as battery backups, to either absorb excess power produced by the fuel cell during times of decreasing power consumption by the computing devices to which such power is being provided, or to source the additional power, which cannot otherwise be provided by the fuel cell due to the limitations described above, which is required by computing devices during times of increasing power consumption. But such battery backups introduce their own costs, inefficiencies and maintenance issues.

Other solutions have attempted to predict computing device processing and, consequently, power consumption, so that a fuel cell could be given advanced notice, thereby providing it with a sufficient amount of time to either increase or decrease its production of electrical power, as appropriate. However, while processing demand can have cyclical aspects to it, it can also often be based on unexpected events. For example, computing devices providing search functionality can be accessed more frequently during business hours than during other times of the day. Consequently, the processing performed by such computing devices and, in turn, their power consumption, can predictably increase during such business hours. But such computing devices can also experience increased access during unexpected events such as, for example, the death of a celebrity. Because such instances are, by definition, unpredictable, no advance notice could have been provided to a fuel cell and, consequently, one or more computing devices powered by such a fuel cell would, again, have to resort to alternative sources of electrical power such as, for example, battery backups.

SUMMARY

In one embodiment, a controller can monitor both a fuel cell providing electrical power to one or more computing devices and the computing devices receiving the power, and can instruct the computing devices to deactivate or throttle down certain power consuming functions during instances where the power consumption demand of the computing devices is increasing more quickly than the power being sourced by the fuel cell, and can instruct the computing devices to activate or throttle up certain power consuming functions during instances where the power consumption demand of the computing devices is decreasing more quickly than the power being sourced by the fuel cell.

In yet another embodiment, fuel cells can be sized to provide power to a defined collection of computing devices, such as a rack of server computing devices in the data center. The data center can comprise gas piping delivering fuel to the individual fuel cells, which can then source electrical energy in a form that can be directly consumed by the processing components and other circuitry of the server computing devices. Such a data center can, thereby, avoid the additional complexities, inefficiencies, and maintenance requirements of traditional data centers receiving and consuming high voltage alternating current electrical energy.

In a further embodiment, the fuel cells of adjacent racks of computing devices can provide backup power in the event that a fuel cell of one or more server racks fail. The power produced by the fuel cells of adjacent racks can either be shared equally with the racks of server computing devices whose fuel cells have failed, or the power produced by such fuel cells can be prioritized such that only excess power is shared with racks of server computing devices whose fuel cells have failed.

In a still further embodiment, fuel cells and server computing devices can be positioned relative to one another to realize thermal symbiotic efficiencies. The heat generated by the server computing devices can be utilized to provide the heat required by the fuel cell. As such, the fuel cell can be positioned above the server computing devices, or air flow can be directed to transfer heat from the server computing devices to the fuel cell.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
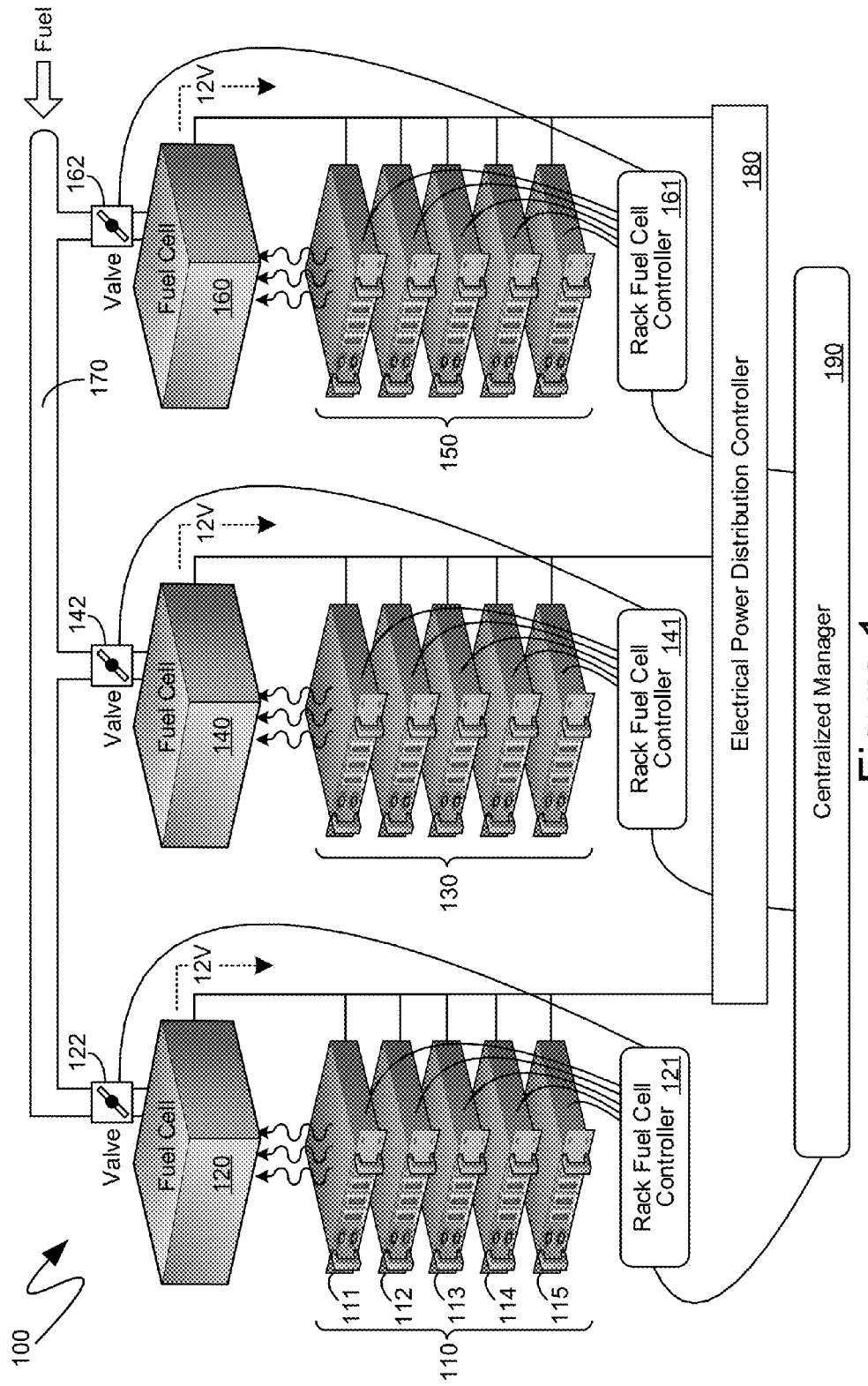
FIG. 1 is a component diagram of an exemplary arrangement of computing devices and fuel cells providing power thereto.

The following description relates to the provision of power to computing devices, such as in a data center, by multiple fuel cells that can consume fuel, such as natural gas, and can output electrical energy in a form that can be natively consumed by the computing devices. Such a data center can avoid the complexities of converting externally sourced high voltage alternating current electrical power into low voltage direct current electrical power consumable by the computing devices. The fuel cells can be sized so as to provide power to a set of computing devices, such as would be oriented in a vertical rack in a data center. Multiple ones of such server rack fuel cells can provide backup for one another, such that the computing devices of a failed fuel cell can receive power from adjacent fuel cells. Additionally, the fuel cells and computing devices can be positioned to realize thermal symbiotic efficiencies, such as the provision of heat from the computing devices to the fuel cells. Controllers can instruct the computing devices to deactivate or throttle down certain power consuming functions during instances where the power consumption demand of the computing devices is increasing more quickly than the power being sourced by the fuel cells, and can instruct the computing devices to activate or throttle up certain power consuming functions during instances where the power consumption demand of the computing devices is decreasing more quickly than the power being sourced by the fuel cells. In such a manner, the need for additional power sources, supplementing a fuel cell's inability to quickly adjust the amount of electrical power provided by it, can be minimized or eliminated entirely.

The techniques described herein make reference to specific types of gas and specific types of gas-consuming equipment. For example, reference is made to natural-gas-powered generators, such as a fuel cell. Such references, however, are strictly exemplary and are made for ease of description and presentation, and are not intended to limit the mechanisms described to specific devices. Instead, the techniques described herein are equally applicable, without modification, to any device or mechanism generating electrical power having an inability to quickly change the amount of power it generates.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated in which multiple fuel cells, each sized for a collection of computing devices, provide electrical power to the computing devices, such as within the context of a data center. As will be recognized by those skilled in the art, fuel cells, such as the illustrated fuel cells 120, 140 and 160, consume fuel, typically natural gas, and output electrical power, typically in the form of a direct current electrical power having the potential appropriate for the direct consumption by the processing components, and other circuitry of computing devices. More specifically, and as one example, a gas solid oxide fuel cell can be utilized which can, as will be understood by those skilled in the art, comprise an electrolyte, typically in the form of a solid ceramic material, and an anode and cathode on opposite sides of the electrolyte, each typically comprised of an ink coating on the electrolyte. Such a fuel cell can accept natural gas as input and, inside of the fuel cell, the natural gas can be mixed with water steam to form a "reformed fuel". This reformed fuel enters the anode side of the electrolyte and as it crosses the anode it attracts oxygen ions from the cathode, which are attracted into the cathode from the hot air that is fed to the fuel cell. The oxygen ions combine with the reformed fuel in the electrolyte to produce electricity, water, and small amounts of carbon dioxide, as well as heat. The heat and water can then be utilized to continue the process, thereby enabling the fuel cell to continue to produce direct current electricity so long as natural gas remains available to it.

Typically, a fuel cell can achieve efficiency ratings of approximately 60% as opposed to, for example, efficiency ratings of 30%-40% for conventional turbines that generate alternating electrical current. More colloquially, a fuel cell can be almost twice as efficient as conventional electricity generating turbines. Additionally, and as evidenced by the detailed description provided above, a fuel cell typically lacks moving parts, except for fans. Such lack of moving parts can make fuel cells more reliable and less prone to mechanical failures.

Fuel cells can also be designed to output electrical power in the form of direct current electricity at, for example 12 Volts or 5 Volts. As will be recognized by those skilled in the art, 12 VDC is typically the native voltage of the data processing circuitry utilized by the server computing devices typically found in data centers. Thus, rather than utilizing existing server computing devices, which comprise power supplies to transform alternating current electrical power into direct current electrical power, the use of fuel cells, such as the fuel cells 120, 140 and 160, can eliminate such power supplies, AC-to-DC conversion, DC-to-DC conversion, and other like mechanisms.

In one embodiment, the fuel cells, such as the fuel cells 120, 140 and 160, shown in FIG. 1, can be sized to power a collection of computing devices, such as server computing devices typically found in a rack of such devices in a data center. For example, and as illustrated in FIG. 1, the server computing devices 111, 112, 113, 114 and 115 can comprise a rack 110 of server computing devices and the fuel cell 120 can be sized to provide power to the rack 110 of computing devices. Thus, to provide an illustrative example, if each of the server computing devices 111, 112, 113, 114 and 115 typically consumes 200 Watts of electrical power, the fuel cell 120 can be sized to produce 1000 Watts of electrical power. The fuel cell 140 can be similarly sized to provide power to the rack 130 of server computing devices, and the fuel cell 160 can be similarly sized to provide power to the rack 150 of server computing devices. In such a manner, a data center comprising racks 110, 130 and 150 of server computing devices need not comprise mechanisms and equipment for converting high voltage alternating current electrical power to medium voltage alternating current and then to low voltage direct current electrical power, and can, instead, simply comprise piping, such as the piping 170, that can provide fuel to the fuel cells, such as the fuel cells 120, 140 and 160. Low voltage direct current electrical power can then be provided by fuel cells directly to the server computing devices and, indeed, in one embodiment, each of the individual server computing devices need not even comprise a power supply, since the fuel cells can provide the low voltage direct current electrical power natively consumed by the processing components and other circuitry of such server computing devices.

Utilizing fuel cells, such as the fuel cells 120, 140 and 160, as a primary source of electrical power for the server computing devices in a data center comprises further advantages beyond merely the simplification of the equipment and maintenance of such a data center. Additionally, for example, such an embodiment can provide greater resistance to downtime due to failures of power delivery mechanisms. In particular, a failure in the commonly utilized electrical grid propagates almost instantaneously such that there is no time to prepare by, for example, shifting processing to other computing devices. Instead, datacenters relying on electrical power sourced from a municipal electrical power grid typically comprise backup sources of electrical power to compensate for such instantaneous and unpredictable faults. By contrast, typical failures of the provision of fuel to fuel cells comprise leaks of such fuel, which do not instantly impact the provision of the fuel to the fuel cells, nor the provision of electrical power from the fuel cells to the server computing devices. Instead, such leaks can be identified and the server computing devices whose fuel cell has been affected can be identified and their processing shifted to other computing devices prior to closing off, such as via a valve, the piping 170, directed to such a fuel cell, in which there is a leak. The leak can then be repaired, fuel flow restored to the fuel cell, and the server computing devices can be brought back online, in a less time constrained manner. Thus, in one embodiment, the piping 170 can comprise components and mechanisms to enable efficient repair including, for example, the use of quick connectors and other like devices, to enable efficient connection and disconnection of various components of the piping 170, a network of valves, such as the exemplary valves 122, 142 and 162, and other like devices, mechanisms and components.

As indicated previously, certain types of fuel cells, such as the above-described gas solid oxide fuel cells, can utilize water steam to form a reformed fuel. Thus, such fuel cells can require heat to convert water into water steam. In one embodiment, a fuel cell powering a rack of servers, such as, for example, the fuel cell 120 powering the rack 110 of server computing devices, can be positioned to achieve thermal symbiotic efficiencies by, for example, utilizing the heat produced by the server computing devices as some of the heat required by the fuel cell to generate the water steam. For example, as illustrated by the system 100 of FIG. 1, a fuel cell powering a rack of server computing devices can be positioned above such server computing devices, such that the heat produced by such server computing devices, rising upward, is received and utilized by such a fuel cell. In an alternative embodiment, not specifically illustrated to maintain illustrative simplicity, a fuel cell can be positioned behind the server computing devices it is powering, such that hot air being vented out of the back of such server computing devices by, for example, fans, can be vented directly into the fuel cell. In yet another embodiment, other heat transfer mechanisms such as, for example, heat sinks, heat pipes and the like can be utilized to direct heat from the processing units and other heat generating components of server computing devices to one or more fuel cells, such as the fuel cells powering such server computing devices.

Because each rack, or collection of server computing devices, can be powered by an individual fuel cell, specifically sized for such a collection of computing devices, a single data center can comprise multiple ones of such individual fuel cells. In one embodiment, such a collection of fuel cells within a single data center can act as its own backup. For example, if the fuel cell 140, shown in the system 100 of FIG. 1, were to fail, an electrical power distribution controller 180 could communicate with the fuel cells 120 and 160 and request that those fuel cells increase their power output in order for the computing devices of the rack 130 to continue to receive power. Thus, in such an example, while repairs were made to the fuel cell 140, or to the portion of the piping 170 providing fuel to the fuel cell 140, the server computing devices of the rack 130 can receive power from the other fuel cells in the data center such as, for example, the fuel cells 120 and 160.

In one embodiment, the electrical power distribution controller 180 can communicate with other controllers and managers such as, for example, the rack fuel cell controllers 121, 141 and 161, and the centralized manager 190, which operation will be described in further detail below, in order to determine whether it is better to distribute power from other fuel cells, such as the fuel cells 120 and 160, to the server computing devices of the rack 130, or whether it is better to move the processing being performed by the server computing devices of the rack 130 to the server computing devices of other racks such as, for example, the racks 110 and 150. For example, if the processing being performed by the server computing devices of the rack 130 has a greater priority than the processing being performed by the server computing devices of the racks 110 and 150, then it may be optimal to shift the processing from the server computing devices of the rack 130 to the server computing devices of the racks 110 and 150, causing the lower priority processing currently being performed by those computing devices to be subordinated to the higher priority processing of the computing devices of the rack 130. In such an example, the fuel cells 120 and 160 need not be required to increase their production of electrical power, which can be advantageous if those fuel cells were already producing electrical power at an upper threshold. As another example, if the processing being performed by the server computing devices of the rack 130 has an equivalent priority to the processing being performed by the server computing devices of the racks 110 and 150, but the power being consumed by the server computing devices of the racks 110 and 150 is below an upper threshold of the amount of power capable of being produced by the fuel cells 120 and 160, it may be advantageous to increase the amount of power being produced by fuel cells 120 and 160 and redirect such excess power to the server computing devices of the rack 130, such as by the electrical power distribution controller 180. In one embodiment, in performing such a redirection, the electrical power distribution controller 180 can provide that the power being produced by a fuel cell such as, for example, the fuel cell 120, is first provided to the server computing devices of the rack 110 associated with such a fuel cell, and only excess electrical power is provided to the server computing devices of the rack 130. In an alternative embodiment, however, the electrical power distribution controller 180 can equally divide the power being produced by the remaining fuel cells, such as, for example, the fuel cells 120 and 160, among all the computing devices, such as, for example, the server computing devices of the racks 110, 130 and 150.

As illustrated in FIG. 1, and as mentioned previously, a rack fuel cell controller can be provided to coordinate the provision of electrical power from a fuel cell to a collection of one or more computing devices. In one embodiment, the rack fuel cell controller can be a single controller, while, in other embodiments, the functionality described below and attributed to such a rack fuel cell controller can be spread among multiple separate controllers. For example, as will be recognized by those skilled in the art, fuel cells can typically comprise their own controllers for purposes of controlling the electrochemical reaction occurring within the fuel cells. In such an instance, a rack fuel cell controller can communicate with such existing fuel cell controllers to request adjustments to the electrical power being provided by a fuel cell. For ease of illustration and description, however, the mechanisms and functionality described below make reference to a single rack fuel cell controller.

In one embodiment, each collection of computing devices, and the fuel cell powering such a collection of computing devices, can have a rack fuel cell controller associated therewith. Thus, as illustrated in the system 100 of FIG. 1, a rack fuel cell controller 121 can coordinate the provision of electrical power by the fuel cell 120 to the server computing devices of the rack 110. In a similar manner, a rack fuel cell controller 141 can coordinate the provision of electrical power by the fuel cell 140 to the server computing devices of the rack 130 and the rack fuel cell controller 161 can coordinate the provision of electrical power by the fuel cell 160 to the server computing devices of the rack 150. In one embodiment, the rack fuel cell controllers in a data center, or portions thereof, such as, for example, the rack fuel cell controllers 121, 141 and 161 can communicate with the centralized manager, such as the centralized manager 190, which can enable coordination among the distinct fuel cells and the distinct collection of server computing devices being powered by such fuel cells, such as will be described in further detail below.

As indicated previously, one drawback to a fuel cell, or other like electrical generating device, can be an inability to quickly respond to changes in the amount of electrical power generated by such a device. For example, if the processing workload of the server computing devices in the rack 110 were to suddenly increase, the power consumed by those computing devices would likewise increase. A rack fuel cell controller 121, in response to such an increase in processing, and the corresponding increase in the amount of power required by the server computing devices in the rack 110, can request that the fuel cell 120 generate additional power. In one embodiment, such a request for additional power can be in the form of an adjustment to a valve, such as the valve 122, which can be adjusted to provide the fuel cell 120 with additional fuel from which to generate additional electrical power. However, as indicated previously, the fuel cell 120 may not instantaneously begin to generate such increased electrical power, and may, instead, slowly increase the amount of electrical power it generates over a more extended period of time. In the meantime, as the server computing devices of the rack 110 consume a greater amount of current to support their increased processing, the fuel cell 120 can continue to source such current but, as will be recognized by those skilled in the art, since the overall electrical power is not increasing sufficiently rapidly, the voltage at which such electrical power provided by the fuel cell 120 can droop. Such a droop can be detrimental to the computing devices of the rack 110 and can cause such computing devices to either throttle down their processing, or shut down entirely.

In one embodiment, therefore, the rack fuel cell controller 121 can compensate for the delayed increase in the power production of the fuel cell 120 by temporarily offloading at least some of the processing being performed by the server computing devices of the rack 110 to one or more server computing devices of other racks of server computing devices, by temporarily throttling down the processing of one or more of the server computing devices of the rack 110, by temporarily deactivating other power consuming components or mechanisms of the server computing devices of the rack 110, such as by temporarily deactivating the fans of such server computing devices, or can perform other like temporary actions or combinations thereof. Yet another alternative can be to halt the processing of low-priority, non-time critical applications or tasks running on the server computing devices, as such an action can have the effect of reducing a total processing load of the server computing devices, thereby lowering a total power consumed by the server computing devices. In one embodiment, low-priority tasks can essentially always be available to either increase processing, such as when a fuel cell is generating more electrical power than is required by the server computing devices, or to decrease processing by having their processing be throttled back, such as when a fuel cell is generating a lesser amount of electrical power than is being requested by the server computing devices. Such perpetually available (for practical purposes) low-priority tasks are often referred to as "vampire tasks" or "vampire processes".

The rack fuel cell controller 121 can, in such an embodiment, base its decisions based upon inputs received from one or more of the server computing devices of the rack 110, the fuel cell 120, the centralized manager 190, and other like components. For example, the server computing devices of the rack 110 can provide, to the rack of fuel cell controller 121, information regarding the processing currently being performed by such server computing devices, the internal temperatures of such server computing devices, the fan speeds and other relevant cooling information, and other like information. Thus, for example, if additional power is required to perform additional processing, which cannot immediately be sourced by the fuel cell 120, and the rack fuel cell controller 121 is aware that one or more of the server computing devices of the rack 110 can operate at higher temperatures than are currently present inside those computing devices, the rack fuel cell controller 121 can instruct one or more of the server computing devices of the rack 110 to deactivate their fans or other like cooling apparatus which consume power, thereby freeing up additional power to be utilized for processing instead of, for example, cooling. As another example, if the information provided by the server computing devices of the rack 110 indicates that the internal temperatures are already at a state in which they should not be allowed to go higher, the rack fuel cell controller 121 can instruct the server computing devices of the rack 110 to temporarily throttle down their processors until the power produced by the fuel cell 120 catches up to the demand of the server computing devices for such power.

As indicated previously, in one embodiment, the rack fuel cell controller 121 can attempt to temporarily offload processing performed by one or more of the server computing devices of the rack 110 to provide the fuel cell 120 with a sufficient amount of time within which to ramp up generation of its electrical power output. Such offloading of processing can be performed in concert with information received from the centralized manager 190. For example, the centralized manager 190 can track the processing being performed by the server computing devices of a data center, including being aware of the amount of processing being performed by individual ones of the server computing devices and the priority assigned to such processing. If, according to the information obtained by the centralized manager 190, one or more other server computing devices have the capability of accepting some of the processing currently being performed by the server computing devices of the rack 110, the centralized manager 190 can so notify the rack fuel cell controller 121 and, in one embodiment, the rack fuel cell controller 121 can offload some of those processes from the server computing devices of the rack 110 to those other server computing devices, at least temporarily, until the fuel cell 120 can source the electrical power required by the server computing devices of the rack 110 to perform all such processing themselves.

A fuel cell's capability to change the amount of electrical power it is producing can be delayed both when attempting to increase the amount of such electrical power produced, and when attempting to decrease the amount of electrical power produced. Thus, for example, if the processing workload of the server computing devices in the rack 110 were to suddenly decrease, the power consumed by those computing devices could, likewise, decrease, resulting in an excess amount of electrical power being produced by the fuel cell 120. In one embodiment, the rack fuel cell controller 121, in response to such a decrease in processing, and a corresponding decrease in the amount of power required by the server computing devices of the rack 110, can request that the fuel cell 120 generate less power, such as, for example, by adjusting the valve 122 to provide the fuel cell 120 with less fuel from which to generate electrical power. Nevertheless, such a change can take time to implement, and in the meantime, because the current being consumed by the server computing devices of the rack 110 can decrease faster than the decrease in the amount of electrical power being produced by the fuel cell 120, the voltage of the electrical power being produced by the fuel cell 120 can surge in a manner well known to those skilled in the art. Such a surge can be detrimental to the server computing devices of the rack 110, and can cause such computing devices to shut down to protect themselves from further damage.

In one embodiment, therefore, the rack fuel cell controller 121 can compensate for the delayed decrease in the power production of the fuel cell 120 by temporarily increasing the power consumption of one or more of the server computing devices of the rack 110. For example, the rack fuel cell controller 121 can activate or increase the cooling apparatus of one or more of the server computing devices of the rack 110, such as by activating or increasing the speed of the fans of such server computing devices. Such an action can consume additional power, and can, thereby, prevent the voltage from surging. As another example, the rack fuel cell controller 121 can obtain processing workload, such as from other server computing devices, for the server computing devices of the rack 110, thereby, again, consuming additional power. As yet another example, the rack fuel cell controller 121 can simply instruct one or more of the server computing devices of the rack 110 to execute loops, or perform other like busywork, just so as to increase the power consumed by such server computing devices, thereby, again, preventing the voltage of the electrical power being generated by the fuel cell 120 from surging. As yet a further example, low-priority, or "vampire" processing can be utilized to throttle up or down the workload on the server computing devices to compensate for, and adjust for, oversupply or under-supply of electrical power by the fuel cell. As before, the decision by the rack fuel cell controller 121 of which such action to perform can be informed by information obtained from one or more of the server computing devices of the rack 110, such as an indication of the processing currently being performed by such server computing devices, a status of various components or mechanisms of such server computing devices, such as the cooling apparatus of such server computing devices, as well as information obtained from the fuel cell 120, the centralized manager 190, or other like controllers and managers.

In one embodiment, in an effort to minimize situations where the power consuming needs of server computing devices change more quickly than the power sourcing ability of fuel cells, the rack fuel cell controllers, such as the rack fuel cell controllers 121, 141 and 161, together with the centralized manager 190, can attempt to predict increases or decreases in the amount of processing being performed by the server computing devices and, consequently, increases or decreases in the amount of power consumed by such server computing devices. For example, the rack fuel cell controllers 121, 141 and 161, the centralized manager 190, or combinations thereof, can have access to, and can maintain, historical data regarding processing previously performed by the server computing devices. Such historical data can be mined for cyclical or repeating information that can be used to predict increases or decreases in processing workload and, consequently, power consumption. For example, processing can increase during specific hours of the day, and can then subsequently decrease. Utilizing such knowledge, the rack fuel cell controllers 121, 141 and 161 can instruct the fuel cells 120, 140 and 160, respectively, to increase the electrical power being generated by such fuel cells in anticipation of such cyclical increases, and then, subsequently, to decrease the electrical power being generated by such fuel cells in anticipation of such cyclical decreases.

In order to accurately control one or more of the server computing devices, such as in the manner described in detail above, one or more calibrations can be performed to associate power consumption parameters with processing parameters. For example, a server computing device can be instructed to perform processing while its processors are set at a particular p-state or other like processing categorization. The power consumed by such a server computing device can then be measured and can be associated with processing performed by such a server computing device when that server computing device's processors are set to that p-state. The processors can then be set to a different p-state, the measurements can be repeated, and another correlation can be made. Such a process can be repeated across various relevant parameters, including, for example, the number of processors actively performing processing, different states of cooling apparatus, and other like parameters. Additionally, other relevant information can be obtained from the specifications of the fuel cells themselves such as, for example, how quickly the fuel cells can increase or decrease the amount of electrical power generated.

In one embodiment, to provide additional electrical power smoothing capability, backup batteries, capacitors, and other like electrical energy storage and delivery components can be utilized. For example, batteries can be utilized to absorb, by being recharged, additional power being produced by a fuel cell during a period in time when the processing, and thus the power consumption, of one or more server computing devices receiving power from such a fuel cell has decreased more quickly than the fuel cell can decrease its generation and provision of such electrical power. Such batteries can then be utilized to produce additional power to supplement the power being provided by a fuel cell during a period when the processing, and thus the power consumption, of one or more server computing devices receiving power from such a fuel cell increases more quickly than the fuel cell can increase its generation and provision of such electrical power. In another embodiment, capacitors, or other like elements, can be utilized either in place of, or in conjunction with, such batteries.

Figure 2:
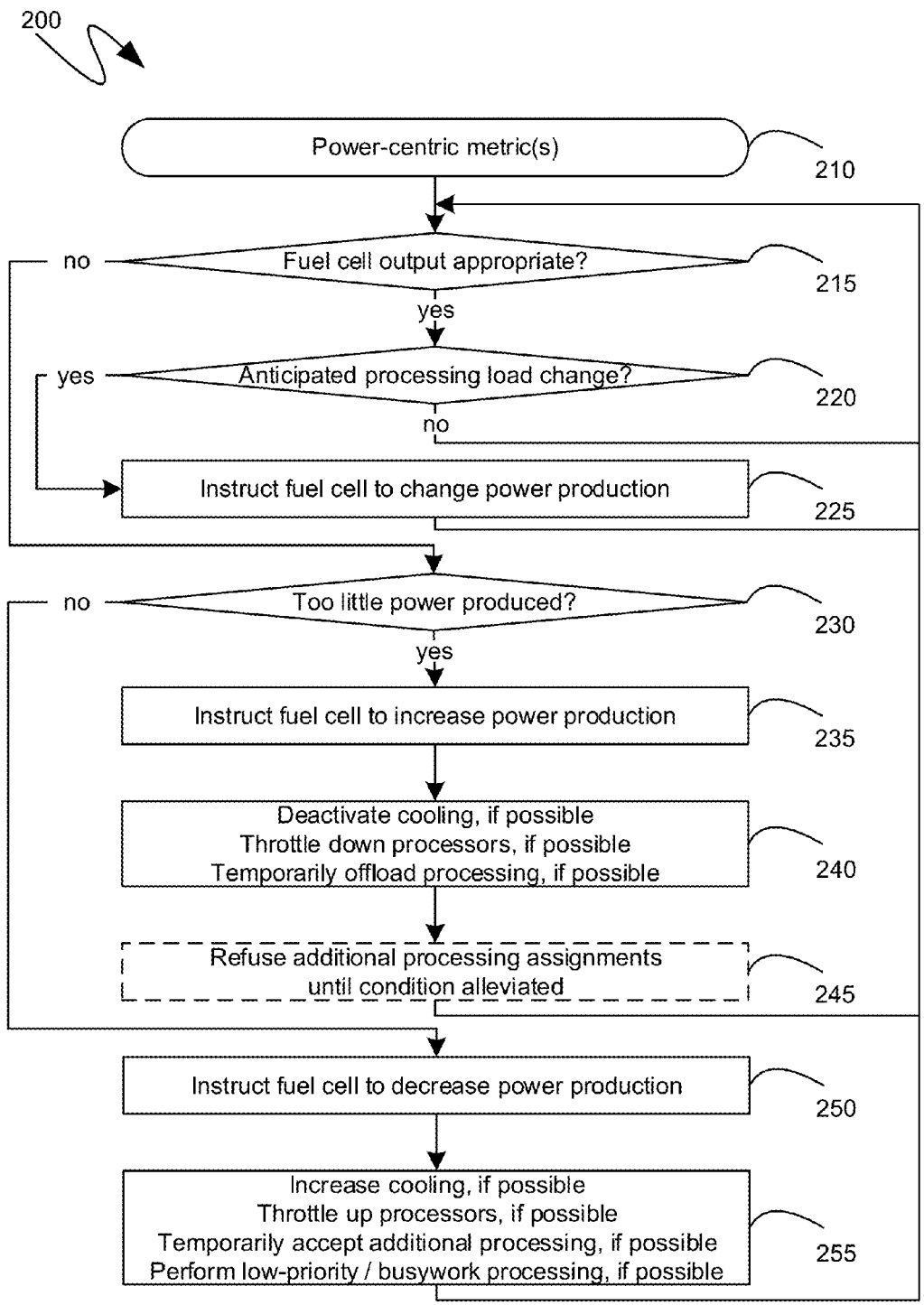
FIG. 2 is a flow diagram of an exemplary management of fuel cell power output through load control.

Turning to FIG. 2, a flow diagram 200 shown therein illustrates an exemplary series of steps that can be performed, such as by a rack fuel cell controller, a centralized manager, combinations thereof, or other like processing components. As illustrated by the flow diagram 200, initially, at step 210, power-centric metrics can be received, including, for example, a measured power output of a fuel cell, processing currently being performed by one or more computing devices receiving power from the fuel cell, a current status of various power consuming components of such computing devices, including cooling components such as fans, current status of other computing devices receiving power from other fuel cells, and the processing being performed thereby, and other like metrics. At step 215, a determination can be made as to whether the electrical power output of the fuel cell is appropriate given the power requirements of the computing device that is receiving power from such a fuel cell. Although illustrated as an explicit step, step 215, as well as steps 220 and 230, need not be explicit decision steps, but rather can be implemented in the form of monitoring computer-executable instructions that perform tasks in response to specific inputs such as, for example, within the case of the exemplary step 215, inputs indicating that the electrical power requirements of one or more computing devices, receiving power from a fuel cell, are either greater than or less than the electrical power currently being generated by the fuel cell.

If, at step 215, is determined that the current electrical power being generated by the fuel cell is appropriate given the power requirements of the computing devices receiving electrical power from such a fuel cell, execution can proceed to step 220 where a determination can be made as to whether any information has been received indicating an anticipated change in the processing load for such computing devices. For example, as indicated previously, historical processing data can be mined to obtain information regarding repeatable, cyclical, or otherwise predictable variations in the processing load. Such information can then be utilized to determine, such as at step 220, whether a change in the amount of processing, which will be performed by the one or more computing devices receiving electrical power from the fuel cell, will be forthcoming. As another example, and as will be recognized by those skilled in the art, there can exist a delay between when a computing device accepts work for processing, and when it actually begins processing that work. In such a case, the acceptance of such processing work can trigger a determination, such as at step 220, that there is an anticipated change in the processing workload.

If, at step 220, is determined that there is an anticipated change in the processing load, then, at step 225, the fuel cell can be instructed to change its power production accordingly. For example, if it is anticipated that the processing load will increase, then the fuel cell can be instructed, at step 225, to increase its power production. Similarly, if it is anticipated that the processing load will decrease, then the fuel cell can be instructed, at step 225, to decrease its power production. After such an instruction to the fuel cell, at step 225, execution can return to step 215. Conversely, if, at step 220, it is determined that there is no anticipated processing load change, then execution can return to step 215 without the performance of step 225.

Returning back to step 215, if it is determined, at step 215, that the electrical power output of the fuel cell is no longer appropriate in light of, for example, a change in the amount of processing being performed at one or more computing devices receiving electrical power from such a fuel cell, then execution can proceed to step 230, at which point a determination can be made as to whether the fuel cell is producing too much power or too little. If the fuel cell is producing too little power, such as if the power requirements of the computing devices increased due to a increase in processing, the fuel cell can be instructed to increase its electrical power production at step 235 and, subsequently, at step 240, one or more actions can be performed to either temporarily reduce the power being consumed by non-processing aspects of the computing devices, thereby making more of the currently produced power available for powering the processing circuitry of the computing devices, or temporarily reduce the processing being performed, and thereby the power needed thereby. For example, and is described in detail above, at step 220, the fans of the computing devices, or other like power consuming components that do not perform processing, can be deactivated, thereby making more of the currently produced power available for powering the processing circuitry. However, if, as indicated previously, the computing device is already operating at a thermal level at which turning off the fans is not an option, then other actions can be performed. As another example, at step 240, some processing being performed by the computing device can be temporarily offloaded to other computing devices, such as computing devices that have extra processing bandwidth, or computing devices being powered by fuel cells that are already producing too much electrical power, such as was described previously. As yet another example, at step 240, if processing cannot be offloaded, one or more processing units can be throttled down to temporarily consume less power while the fuel cell increases its electrical power production in response the instruction of step 235.

In one embodiment, at step 245, if, as part of the processing performed at step 240, it is determined that there were no non-processing components of the computing devices that could be temporarily deactivated, and it was also determined that no other computing devices could temporarily accept offloaded processing, then a determination can be made to refuse additional processing assignments until such conditions are alleviated, or until the fuel cell increases its electrical power output to accommodate such additional processing assignments. Because step 245 can be considered to be an optional step, it is illustrated in FIG. 2 with dashed lines. The execution of the exemplary flow diagram 200 of FIG. 2 can then return to step 215.

Returning back to step 230, if, at step 230, it was determined that the fuel cell was providing too much power, such as, for example, if the processing performed by one or more computing devices receiving power from such a fuel cell decreased, then, at step 250, the fuel cell can be instructed to decrease power production. In the meantime, until the fuel cell can respond to such an instruction from step 250, other actions can be performed, at step 255, that can increase the amount of power being consumed by the computing devices, or associated components, that are receiving power from the fuel cell that is currently providing too much power. For example, and as was described above, the fans of one or more computing devices, or other like non-processing apparatus, can be increased at step 255, thereby consuming additional power. As another example, at step 255, the processing performed by one or more computing devices receiving power from the fuel cell can be increased. For example, such processing can be increased by temporarily accepting additional processing work from other computing devices. As another example, such processing can be increased by temporarily performing low priority processes to consume additional electrical power and avoid a voltage surge. As yet another example, one or more processors can be throttled up such that the processing currently being performed by such processors is performed at a faster rate, but with increased power consumption. Alternatives and combinations of such actions can also be performed at step 255 to increase the amount of power being consumed, and thereby avoid a voltage surge from the fuel cell while the fuel cell transitions to a lower power output. Execution can then return to step 215.

Figure 3:
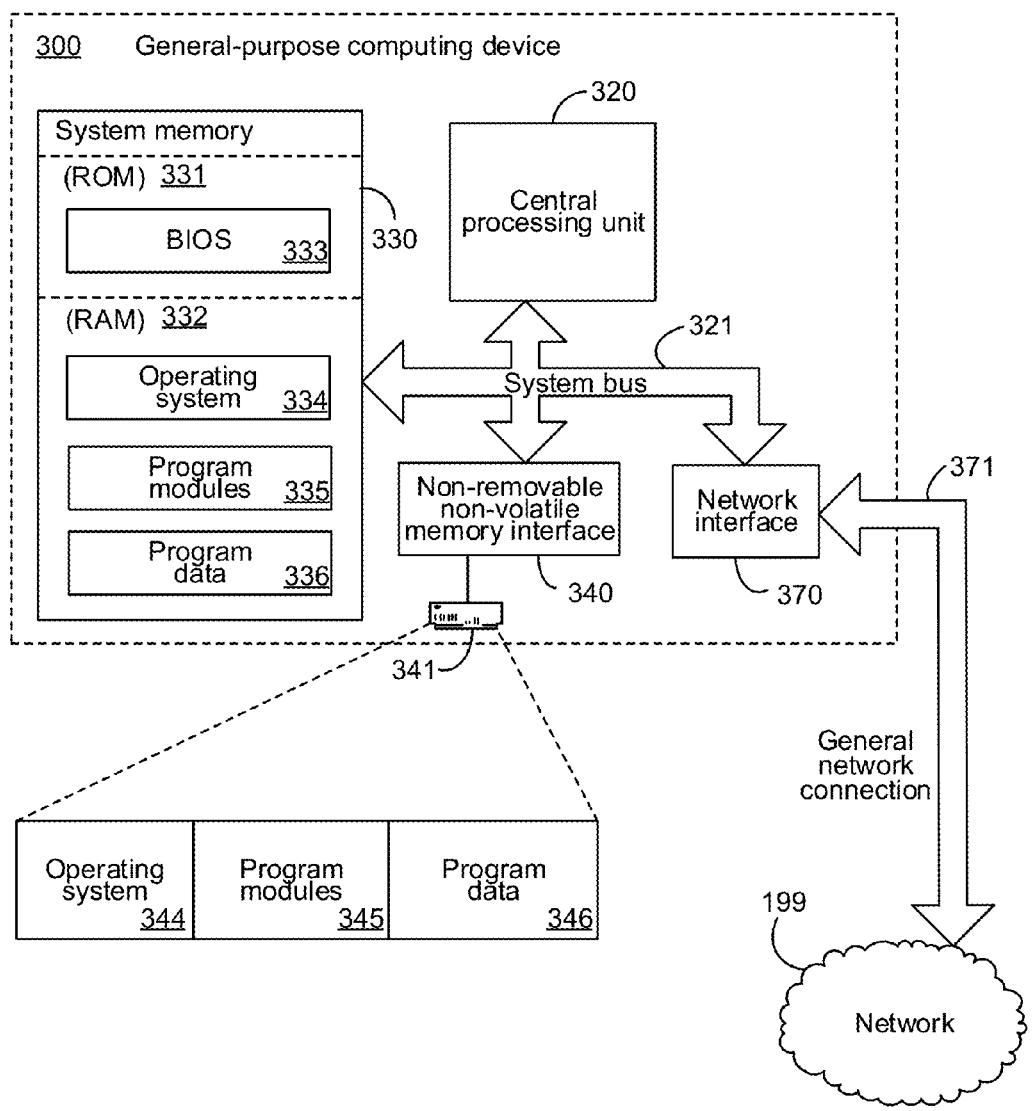
FIG. 3 is a block diagram illustrating an exemplary general purpose computing device.

In one embodiment, the steps of the flow diagram 200 of FIG. 2 can be performed by one or more of the computing devices of the data center, or can be performed by one or more computing devices that are remote from the data center. Turning to FIG. 3, an exemplary general-purpose computing device, such as one of the one or more computing devices that can perform the steps of the flow diagram of FIG. 2, is illustrated in the form of the exemplary general-purpose computing device 300. The exemplary general-purpose computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the general-purpose computing device 300 can be physically co-located, such as on a single chip. In such a case, some or all of the system bus 321 can be nothing more than communicational pathways within a single chip structure and its illustration in FIG. 3 can be nothing more than notational convenience for the purpose of illustration.

The general-purpose computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 300. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

When using communication media, the general-purpose computing device 300 may operate in a networked environment via logical connections to one or more remote computers. The logical connection depicted in FIG. 3 is a general network connection 371 to the network 199, which can be a local area network (LAN), a wide area network (WAN) such as the Internet, or other networks. The computing device 300 is connected to the general network connection 371 through a network interface or adapter 370 that is, in turn, connected to the system bus 321. In a networked environment, program modules depicted relative to the general-purpose computing device 300, or portions or peripherals thereof, may be stored in the memory of one or more other computing devices that are communicatively coupled to the general-purpose computing device 300 through the general network connection 371. It will be appreciated that the network connections shown are exemplary and other means of establishing a communications link between computing devices may be used.

The general-purpose computing device 300 may also include other removable/non-removable, volatile/nonvolatile computer storage media. By way of example only, FIG. 3 illustrates a hard disk drive 341 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the general-purpose computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers here to illustrate that, at a minimum, they are different copies.

As can be seen from the above descriptions, a server rack fuel cell has been presented. Which, in view of the many possible variations of the subject matter described herein, we claim as our invention all such embodiments as may come within the scope of the following claims and equivalents thereto.

We claim:

1. A method of accommodating differences between a rate of decrease in electrical power generation by a fuel cell and a rate of decrease in electrical power consumption by a computing device, the method comprising the steps of:
   detecting a surge condition by determining that the electrical power generation by the fuel cell is decreasing, in response to an instruction to the fuel cell to decrease its electrical power generation, less quickly than a decrease in the electrical power consumption by the computing device on account of which the instruction was generated, thereby resulting in a voltage surge beyond a threshold amount in the electrical power being provided to the computing device; and
   performing, on the computing device, in response to the detecting the surge condition, surge-relieving actions until the surge condition is no longer detected, the surge-relieving actions comprising at least one of: increasing operation of one or more cooling apparatus of the computing device, throttling up one or more processors of the computing device, requesting additional processing work to be performed by the computing device, or increasing execution of low-priority tasks by the computing device.

2. The method of claim 1, wherein the surge-relieving actions are performed while the electrical power generation by the fuel cell continues to decrease in response to the instruction.

3. The method of claim 1, wherein the electrical power generated by the fuel cell is output as direct current electrical energy having a voltage natively useable by at least some of the one or more processors of the computing device.

4. The method of claim 1, wherein the instruction is generated in anticipation of the decrease in the electrical power consumption by the computing device, based on processing that is anticipated to be subsequently performed by the computing device.

5. The method of claim 4, wherein the anticipated processing is based on cyclical trends identified from historical processing by the computing device.

6. The method of claim 1, wherein the performing the surge-relieving actions is informed by an empirically derived correlation between a p-state and a power consumed by at least one processor, from among the one or more processors of the computing device, while the at least one processor is set at the p-state, the p-state being one of a multiple of p-states in which the at least one processor can operate.

7. The method of claim 1, further comprising:
   detecting a droop condition by determining that the electrical power generation by the fuel cell is increasing, in response to a second instruction to the fuel cell to increase its electrical power generation, less quickly than an increase in the electrical power consumption by the computing device on account of which the second instruction was generated, thereby resulting in a voltage droop beyond a threshold amount in the electrical power being provided to the computing device; and
   performing, on the computing device, in response to the detecting the droop condition, droop-relieving actions until the droop condition is no longer detected, the droop-relieving actions comprising at least one of: decreasing the operation of the one or more cooling apparatus of the computing device, throttling down the one or more processors of the computing device, offloading processing work from the computing device to one or more other computing devices, or decreasing execution of the low-priority tasks by the computing device.

8. A method of accommodating differences between a rate of increase in electrical power generation by a fuel cell and a rate of increase in electrical power consumption by a computing device, the method comprising the steps of:
   detecting a droop condition by determining that the electrical power generation by the fuel cell is increasing, in response to an instruction to the fuel cell to increase its electrical power generation, less quickly than a increase in the electrical power consumption by the computing device on account of which the instruction was generated, thereby resulting in a voltage droop beyond a threshold amount in the electrical power being provided to the computing device; and
   performing, on the computing device, in response to the detecting the droop condition, droop-relieving actions until the droop condition is no longer detected, the droop-relieving actions comprising at least one of: decreasing operation of one or more cooling apparatus of the computing device, offloading processing work from the computing device to one or more other computing devices, or decreasing execution of low-priority tasks by the computing device.

9. The method of claim 8, wherein the droop-relieving actions are performed while the electrical power generation by the fuel cell continues to increase in response to the instruction.

10. The method of claim 8, wherein the instruction is generated in anticipation of the increase in the electrical power consumption by the computing device, based on processing that is anticipated to be subsequently performed by the computing device.

11. A device comprising:
    one or more processors; and
    one or more computer-readable media comprising computer-executable instructions, which, when executed, cause the device to:
       detect a surge condition by determining that electrical power generation by a fuel cell powering the device is decreasing, in response to an instruction to the fuel cell to decrease its electrical power generation, less quickly than a decrease in the electrical power consumption by the device on account of which the instruction was generated, thereby resulting in a voltage surge beyond a threshold amount in the electrical power being provided to the device; and
       perform, in response to the detecting the surge condition, surge-relieving actions until the surge condition is no longer detected, the surge-relieving actions comprising at least one of: increasing operation of one or more cooling apparatus of the device, throttling up one or more processors of the device, requesting additional processing work to be performed by the device, or increasing execution of low-priority tasks by the device.

12. The device of claim 11, further comprising the fuel cell.

13. The device of claim 12, wherein the fuel cell and the one or more processors are arranged such that heat from at least some of the one or more processors is directed to the fuel cell.

14. The device of claim 11, further comprising a fuel cell controller that executes the computer-executable instructions, the fuel cell controller being separate from the one or more processors.

15. The device of claim 11, wherein the electrical power output by the fuel cell is output as direct current electrical energy having a voltage natively useable by at least some of the one or more processors.

16. The device of claim 11, wherein the surge-relieving actions are performed while the electrical power generation by the fuel cell continues to decrease in response to the instruction.

17. The device of claim 11, wherein the instruction is generated in anticipation of the decrease in the electrical power consumption by the device, based on processing that is anticipated to be subsequently performed by the device.

18. The device of claim 17, wherein the anticipated processing is based on cyclical trends identified from historical processing by the device.

19. The device of claim 11, wherein the performing the surge-relieving actions is informed by an empirically derived correlation between a p-state and a power consumed by at least one processor, from among the one or more processors of the device, while the at least one processor is set at the p-state, the p-state being one of a multiple of p-states in which the at least one processor can operate.

20. The device of claim 11, wherein the one or more computer-readable media comprise further computer-executable instructions, which, when executed, cause the device to:
    detecting a droop condition by determining that the electrical power generation by the fuel cell is increasing, in response to a second instruction to the fuel cell to increase its electrical power generation, less quickly than an increase in the electrical power consumption by the device on account of which the second instruction was generated, thereby resulting in a voltage droop beyond a threshold amount in the electrical power being provided to the device; and
    performing, on the computing device, in response to the detecting the droop condition, droop-relieving actions until the droop condition is no longer detected, the droop-relieving actions comprising at least one of: decreasing the operation of the one or more cooling apparatus of the device, throttling down the one or more processors of the device, offloading processing work from the device to one or more other devices, or decreasing execution of the low-priority tasks by the device.

* * * * *